United States Patent [19]
Nishida et al.

[11] Patent Number: 6,160,720
[45] Date of Patent: Dec. 12, 2000

[54] SWITCHING POWER SUPPLY UNIT UTILIZING A VOLTAGE DROPPING CIRCUIT

[75] Inventors: Akio Nishida; Koji Nakahira, both of Kyoto, Japan

[73] Assignee: Murata Manufacturing Co., Ltd., Japan

[21] Appl. No.: 09/477,543

[22] Filed: Jan. 4, 2000

[30] Foreign Application Priority Data

Jan. 18, 1999 [JP] Japan .................................. 11-009467
Sep. 7, 1999 [JP] Japan .................................. 11-253551

[51] Int. Cl.$^7$ ................................................ H02M 3/335
[52] U.S. Cl. ............................................... 363/19; 363/97
[58] Field of Search .................................. 363/18, 19, 95, 363/97, 131; 323/902

[56] References Cited

U.S. PATENT DOCUMENTS

| | | | |
|---|---|---|---|
| 3,839,659 | 10/1974 | Bruijning et al. ................... | 315/209 R |
| 4,387,418 | 6/1983 | Koike ......................................... | 363/19 |
| 4,688,159 | 8/1987 | Marinus ..................................... | 363/21 |
| 4,766,528 | 8/1988 | Marinus ..................................... | 363/21 |
| 5,012,399 | 4/1991 | Takemura et al. ......................... | 363/18 |
| 5,745,353 | 4/1998 | Sato et al. .................................. | 363/56 |
| 5,943,222 | 8/1999 | Ogawa ....................................... | 363/19 |
| 5,995,382 | 11/1999 | Miyazaki et al. ......................... | 363/19 |
| 6,038,143 | 3/2000 | Miyazaki et al. ......................... | 363/19 |

*Primary Examiner*—Edward H. Tso
*Assistant Examiner*—Bao Q. Vu
*Attorney, Agent, or Firm*—Ostrolenk, Faber, Gerb & Soffen, LLP

[57] ABSTRACT

A switching power supply unit containing a DC power supply; a transformer having a primary winding, a secondary winding and a feedback winding, a main switching element connected in series to the primary winding to be turned on by a voltage generated at the feedback winding, and a voltage dropping circuit for dropping the output voltage obtained form the secondary winding to reduce a fly-back voltage so that the voltage of a control terminal of the main switching element is maintained at a lower value than a threshold voltage of the main switching element.

10 Claims, 7 Drawing Sheets

SWITCHING POWER SUPPLY UNIT UTILIZING A VOLTAGE DROPPING CIRCUIT

BACKGROUND OF THE INVENTION

1. Field of the Invention

The present invention relates to a switching power supply unit, and more particularly to a switching power supply unit of a self-excitation-type ringing choke converter (hereinafter abbreviated as RCC) system.

2. Description of the Related Art

In general, electronic equipment, such as electronic calculators or communication devices, needs a stable DC voltage. Thus, in order to supply a stable DC voltage to such electronic equipment from a commercial AC power supply, switching power supply units of the RCC system, in which relatively easy construction is possible to obtain high efficiency, have been widely used. A structure of such a switching power supply unit will be illustrated referring to FIG. 6.

In this figure, reference numeral 1 indicates a switching power supply unit, which has an input circuit 2, a main operation circuit 3, a voltage detection circuit 4, a control circuit 5, an output terminal OUT, and a ground terminal GND.

Among these components, the input circuit 2 has a rectifying diode bridge DB, a fuse F, and a filter circuit LF. Both the fuse F and the filter circuit are disposed between an AC power supply and an input end of the rectifying diode bridge DB.

In addition, the main operation circuit 3 has a smoothing capacitor C1 disposed between the output ends a and b of the diode bridge DB of the input circuit 2, a transformer T having a primary winding N1, a secondary winding N2 having the polarity opposite to that of the primary winding N1 and a feedback winding NB with the same polarity as that of the primary winding N1, an FET Q1 as a main switching element connected in series to an end of the primary winding N1 of the transformer T, a starting resistor R1 connected between the other end of the primary winding N1 and the gate as the control terminal of the FET Q1, a resistor R8 connected between the gate and source of the FET Q1, a rectifying diode D1 connected in series to an end of the secondary winding N2 of the transformer T, and a smoothing capacitor C4 connected between an end of the secondary winding N2 and the output terminal.

The voltage detection circuit 4, which is disposed on the output side of the main operation circuit 3, includes a resistor R5, a light-emitting diode PD on the light-emitting side of a photo coupler PC, a shunt regulator Sr, and resistors R6 and R7. Among these components, the resistor R5, the anode and cathode of the light-emitting diode PD, and the cathode of the shunt regulator Sr are mutually connected in series and are disposed in parallel to the capacitor C4 of the main operation circuit 3. In addition, the resistors R6 and R7 are also mutually connected in series and are also disposed in parallel to the capacitor C4. The node of the resistors R6 and R7 is connected to a reference of the shunt regulator Sr.

Furthermore, the control circuit 5 includes a resistor R9 and a capacitor C3 connected in series between one end of the feedback winding NB and the gate of the FET Q1, a transistor Q2 connected between the gate and source of the FET Q1, a resistor R2 connected between one end of the feedback winding NB and the base of the transistor Q2, a resistor R3 and a capacitor C2 connected in parallel between the base and emitter of the transistor Q2, a resistor R4, a diode D2, and a photo transistor PT on the light-receiving side of the photo coupler PC, which are mutually connected in series between one end of the feedback winding NB and the base of the transistor Q2.

Next, a description will be given of the operation of a switching power supply unit 1 having such a structure.

First, on startup, a voltage is applied to the gate of the FET Q1 via the resistor R1 to turn on the FET Q1. When the FET Q1 is turned on, a power supply voltage is applied to the primary winding N1 of the transformer T, and then, at the feedback winding NB is generated a voltage of the same direction as that of the voltage generated at the primary winding N1, whereby the FET Q1 is rapidly turned on by a positive feedback. In this situation, excitation energy is charged in the primary winding N1.

After that, when the base potential of the transistor Q2 reaches a threshold, the transistor Q2 is turned on, whereas the FET Q1 is turned off. This permits the excitation energy charged in the primary winding N1 of the transformer T during the ON time of the FET Q1 to be discharged as electric energy via the secondary winding N2. The energy is rectified by the diode D1 and is smoothed by the capacitor C4 to be supplied to a load.

When the excitation energy charged in the primary winding N1 of the transformer T is discharged via the secondary winding N2, a fly-back voltage VNB is generated at the feedback winding NB. Changes in the fly-back voltage VNB will be illustrated referring to FIG. 7. In this figure, at a point-in-time t11, the FET Q1 is turned off and the fly-back voltage VNB is maintained at an almost fixed value to enter the so-called OFF time. Then, at a point-in-time t12, the voltage of the diode D1 becomes zero, and the fly-back voltage VNB begins to resonate. At a point-in-time t13, when the fly-back voltage VNB reaches a threshold Vth of the FET Q1, the FET Q1 is turned on. The dotted line of the fly-back voltage VNB indicates changes in a case where it is assumed that the fly-back voltage VNB continues to resonate even after the turn-on of the FET Q1. In this way, when the FET Q1 is turned on, a voltage is again applied to the primary winding N1 of the transformer T, whereby excitation energy is again charged in the transformer primary winding.

In the switching power supply unit 1, the above-described oscillating operation is repeated.

In a steady state, the output voltage of the load is divided by the resistors R6 and R7, and the divided detection voltage is compared with a reference voltage of the shunt regulator Sr. After the comparison, the amount of fluctuations in the output voltage is amplified by the shunt regulator Sr, and current flowing to the light-emitting diode PD of the photo coupler PC changes, in which the impedance of the photo transistor PT changes according to the light-emitting amount of the light-emitting diode PD. This operation permits the time for charging/discharging the capacitor C2 to be changed, so that the output voltage is regulated.

In the conventional switching power supply unit 1, however, switching losses under light load are large, which leads to reduced circuit efficiency.

SUMMARY OF THE INVENTION

The present invention can solve the aforementioned problem and provide a switching power supply unit capable of suppressing increase in switching losses under light load.

To this end, the present invention provides a switching power supply unit including a DC power supply, a transformer having a primary winding, a secondary winding and a feedback winding, and a main switching element connected in series to be turned on by a voltage generated at the feedback winding, so that a DC output can be obtained. In this switching power supply unit, a voltage dropping circuit for dropping the output voltage is provided, and the output voltage is dropped by the voltage dropping circuit to reduce a fly-back voltage generated at the feedback winding during the OFF time of the main switching, so that the voltage of a control terminal of the main switching element is maintained at a lower value than that of a threshold voltage of the main switching element.

In addition, as the voltage dropping circuit, there are provided a switching element and a resistor connected in series to the collector thereof to dispose an impedance adjustment circuit for changing impedance determining the output voltage.

Furthermore, as the voltage dropping circuit, there is provided a reference-voltage adjustment circuit for changing a reference voltage determining the output voltage.

Furthermore, the voltage dropping circuit is driven by a signal input from the outside.

According to the switching power supply unit having the above structure, the voltage dropping means permits an output voltage to be dropped. In this case, since the fly-back voltage generated at the feedback winding of the transformer increases or decrease in proportion to the output voltage, adjusting the dropping level of the output voltage and reducing the fly-back voltage generated during the OFF time of the main switching element allows the voltage of the control terminal of the main switching element to resonate at a lower value than that of a threshold voltage, in which the turn-on of the main switching element by the fly-back voltage can be prevented. This operation delays the turn-on of the main switching element and allows the OFF time thereof to be prolonged, in which the oscillation frequency in the switching power supply unit is reduced. As a result, increase in switching losses caused by the rising of the oscillation frequency can be suppressed so that circuit efficiency can be improved.

In addition, according to the switching power supply unit in accordance with the present invention, the switching element forming the impedance adjustment circuit as the voltage dropping circuit is turned on, in which impedance for determining the output voltage is changed or the reference voltage is changed by impedance generated at the resistor similarly forming the impedance adjustment circuit so as to change the output voltage.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
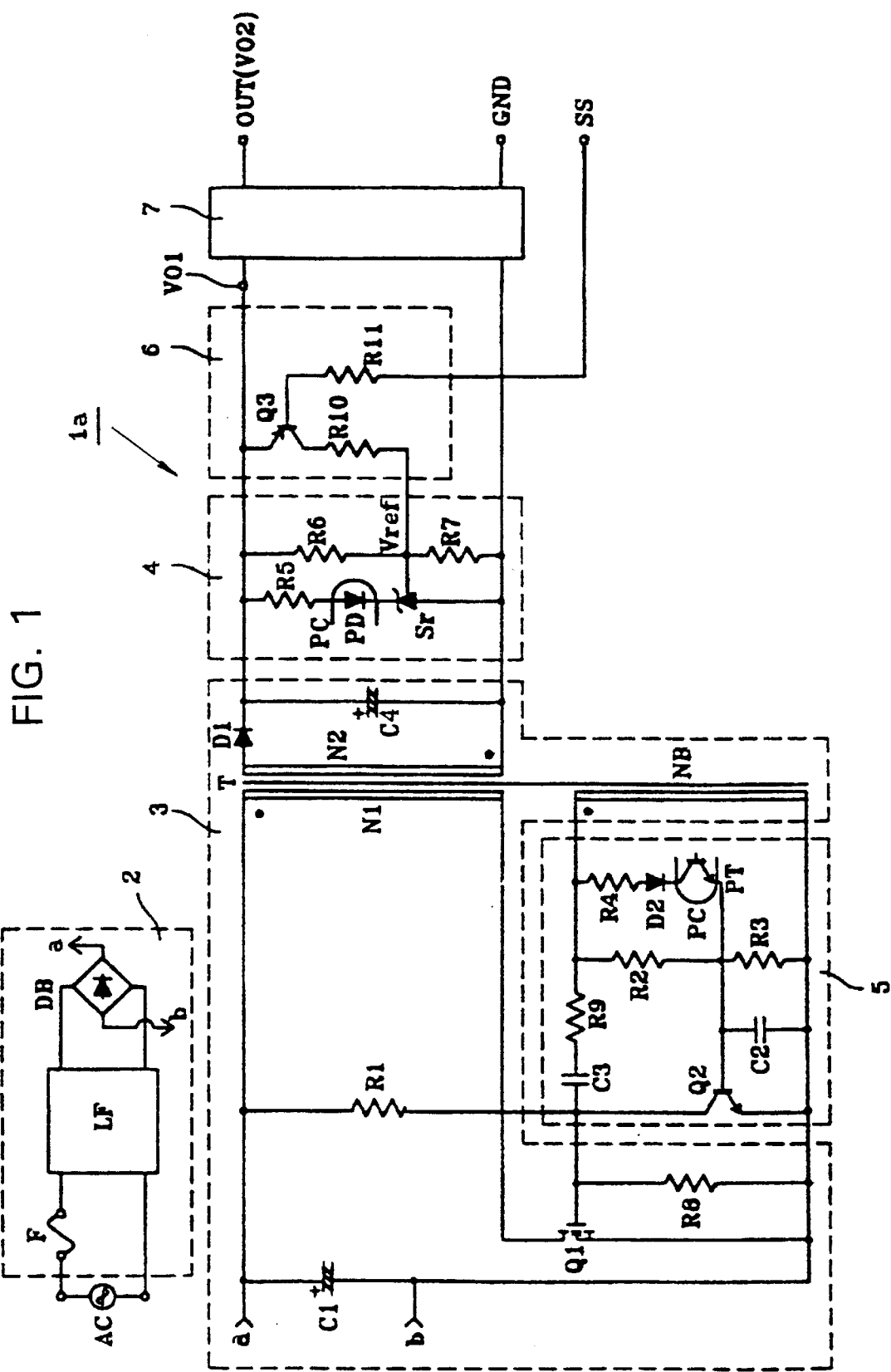
FIG. 1 is a circuit diagram of a switching power supply unit according to a first embodiment of the present invention.
Figure 6:
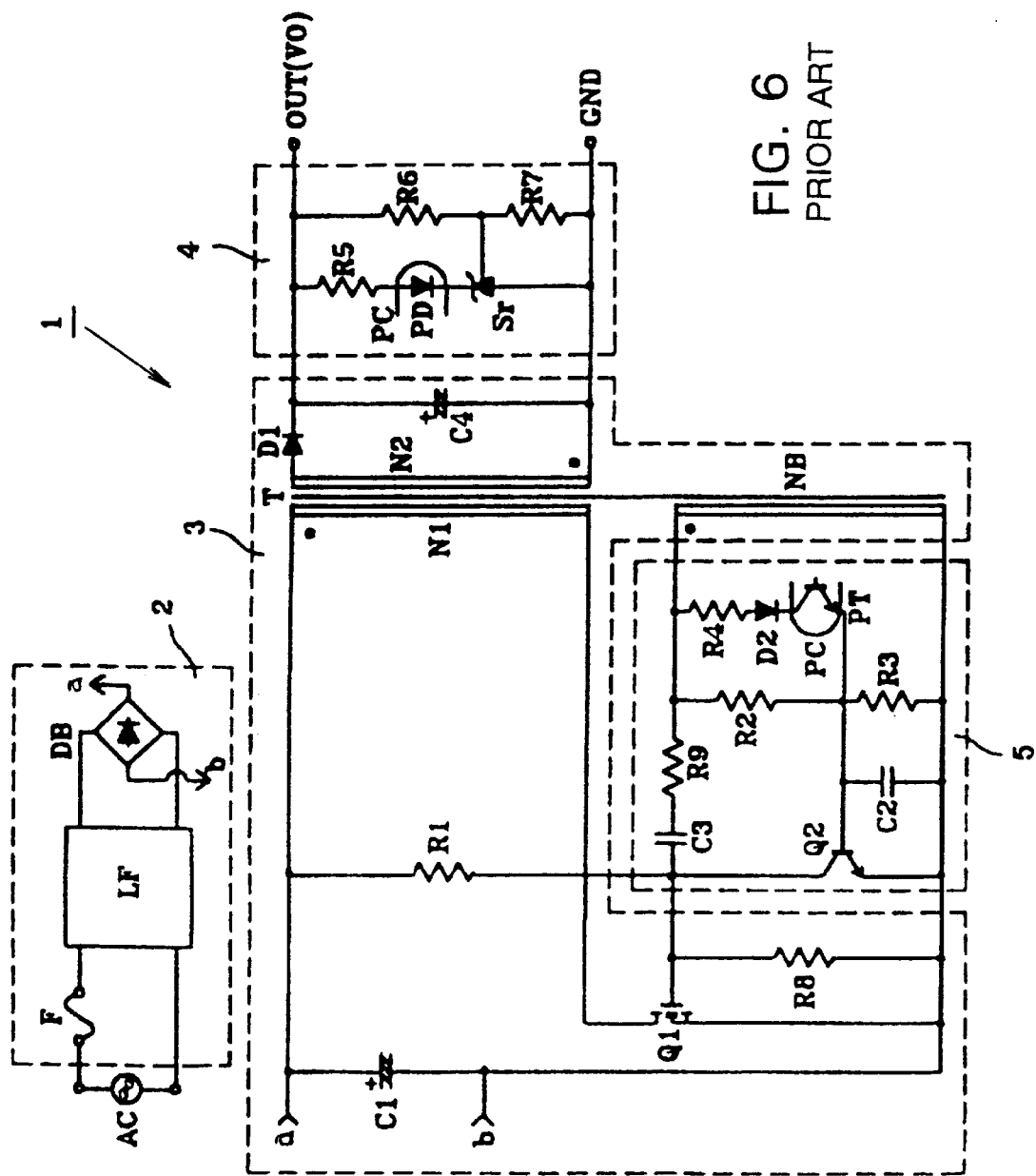
FIG. 6 is a circuit diagram showing a conventional switching power supply unit.

A structure of a switching power supply unit according to a first embodiment of the present invention will be illustrated referring to FIG. 1. The switching power supply unit 1a shown in the figure is different from the switching power supply unit 1 shown in FIG. 6 in that an impedance adjustment circuit 6 and a DC-DC converter 7 as a voltage dropping circuit for dropping an output voltage VO1 are disposed on the output side of the voltage detection circuit 4. In this figure, except for the impedance adjustment circuit 6 and the DC-DC converter 7, the same parts as those in FIG. 6 or the equivalent parts thereto are given the same reference numerals and the explanation thereof is omitted.

In FIG. 1, the impedance adjustment circuit 6 forming the switching power supply unit 1a includes a transistor Q3 as a switching element and resistors R10 and R11. The emitter of the transistor Q3 is connected to one end of the secondary winding N2 of a transformer T via a diode D1, whereas the collector thereof is connected to a shunt regulator Sr of the voltage detection circuit 4 via the resistor R10. In addition, the base of the transistor Q3 is connected to a reception terminal SS via the resistor R11. The reception terminal SS is connected to an electronic device as a load.

In addition, the DC-DC converter 7 is well known as a step-up converter, a step-down converter, or a step-up/step-down converter. The detailed explanation of the structure thereof is omitted.

In this case, the switching power supply unit 1a is used in conjunction with a transmission unit (not shown) disposed in the electronic device as a load. That is, if the load of the switching power supply unit 1a e.g., is a facsimile unit, in a so-called waiting period (under light load) in which the power supply of the facsimile unit is turned on, whereas transmission and reception of data are not being performed, a signal outputted from the transmission unit (not shown) disposed in the facsimile unit is applied to the impedance adjustment circuit 6 via the reception terminal SS of the switching power supply unit 1a. This allows the transistor Q3 of the impedance adjustment circuit 6 to be put in a state of continuity, in which impedance for determining the value of the output voltage VO1 is generated by the resistor R10 of the impedance adjustment circuit 6 in addition to the resistors R6 and R7 of the voltage detection circuit 4.

A description will be given about how the value of the output voltage VO1 varies with such changes in impedance, by using logical expressions. In the following equations (1) to (3), reference character Vref denotes the reference voltage of the shunt regulator Sr, and reference numerals R6, R7, and R11 indicate the resistance values of the resistors R6, R7, and R10.

The output voltage Vo1 obtained when the transistor Q3 of the impedance adjustment circuit 6 is not in a state of continuity is indicated by equation (1) below.

$$VO1 = Vref \times \{(R6+R7)/R7\} \quad (1)$$

In contrast, the output voltage VO1 obtained when the transistor Q3 is in a state of continuity is indicated by an equation (2) below.

$$VO1 = Vref \times (1/R7) \times \{R7 + (R6 \times R10)/(R6+R10)\} \quad (2)$$

Here, an equation (3) below holds.

$$R6 >= (R6 \times R10)/(R6+R10) \quad (3)$$

In addition, the relationship between the output voltage VO1 of equation (1) and the output voltage VO2 of equation (2) is indicated by an equation (4) below.

$$VO1(\text{the equation}(1)) >= VO1(\text{the equation}(2)) \quad (4)$$

Equation (4) holds only when R10 is infinite.

As described above, when the transistor Q3 conducts and the impedance for determining the output voltage VO1 changes, the output voltage VO1 drops.

In this situation, the absolute value of the fly-back voltage generated at the feedback winding of the transformer is a value in proportion to the value obtained by adding a forward voltage drop of the diode D1 to an output voltage according to the turn ratio of the feedback winding. In the switching power supply unit 1a, advantage is taken that the absolute value of the fly-back voltage VNB is proportional to the output voltage VO1 in order to adjust the level of drop of the output voltage VO1 by the impedance adjustment circuit 6. In addition, the fly-back voltage VNB generated during the OFF time of the FET Q1 as a switching element is reduced. With this arrangement, the switching power supply unit 1a is set such that the voltage of the gate as the control terminal of the FET Q1 resonates at a lower value than a threshold value at which the FET Q1 turns on.

Figure 2:
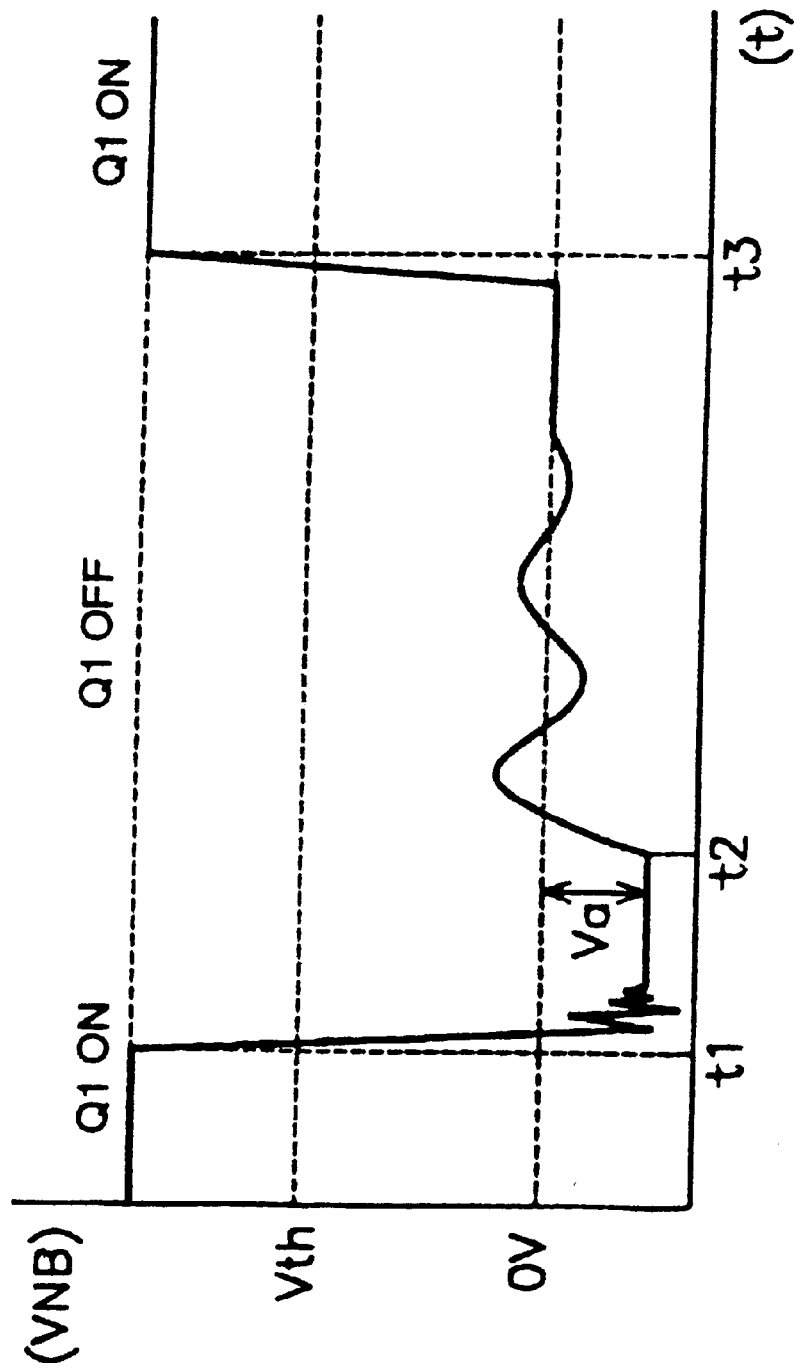
FIG. 2 is an illustrative view showing changes in a voltage generated at a feedback winding of the switching power supply unit shown in FIG. 1.

FIG. 2 shows such changes in the fly-back voltage VNB.

In FIG. 2, at a point-in-time t1, the FET Q1 is turned off, and after the occurrence of a surge, the fly-back voltage VNB is maintained at an almost fixed value to enter the so-called OFF time.

In this situation, the absolute value of the fly-back voltage VNB during the OFF time is indicated by equation (5) below. In equation (5), the symbol NB indicates the turn number of the feedback winding NB of the transformer T, the symbol N2 indicates the turn number of the primary winding, and the symbol VF indicates a forward voltage of the rectifying diode D1 of the main operation circuit 3.

$$|VNB| = (NB/N2) \times (VO1 + VF) \quad (5)$$

Figure 7:
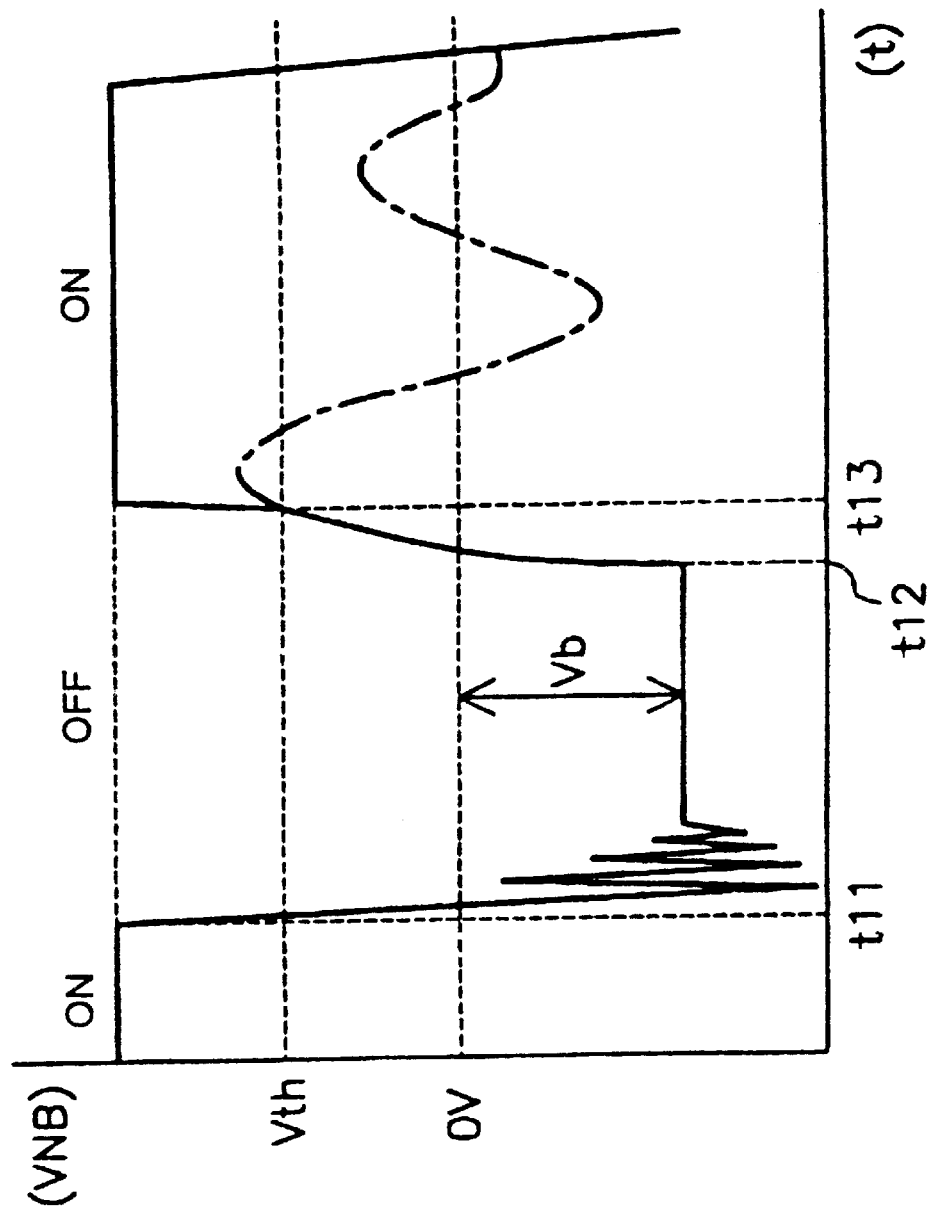
FIG. 7 is an illustrative view showing changes in a voltage generated at a feedback winding of the switching power supply unit shown in FIG. 7.

Furthermore, in proportion to the drop of the output voltage VO1 due to the operation of the impedance adjustment circuit 6, the output VO1 included in equation (5) becomes smaller, whereby the absolute value of the fly-back voltage VNB is reduced. In other words, the absolute value of the fly-back voltage VNB of the switching power supply unit in accordance with the present invention, which is indicated by the symbol Va in FIG. 2, is smaller than that of the conventional switching power supply unit, which is indicated by the symbol Vb in FIG. 7.

Although the fly-back voltage VNB starts to resonate at the point-in-time t2, since it is maintained at a relatively low value until the point-in-time t2, amplitude is small and the value of the gate voltage of the FET Q1 is thereby lower than the threshold value Vth, with the result that the turn-on of the FET Q1 by the fly-back voltage VNB is prevented.

After this, at the point-in-time t3, a voltage is applied to the gate of the FET Q1 by the starting circuit (which is referred to as the starting resistor R1 in this embodiment) of the FET Q1 forming the main operation circuit 3 so as to turn on the FET Q1.

As described above, since the turn-on of the FET Q1 is delayed and the OFF time thereof is prolonged, the oscillation frequency is reduced. Therefore, increase in switching losses due to the rising of the oscillation frequency is suppressed, which leads to improvement in circuit efficiency.

The dropped output voltage VO1 is stepped up to a desired value by the DC-DC converter 7 to an output voltage VO2, which is supplied to a load.

Figure 3:
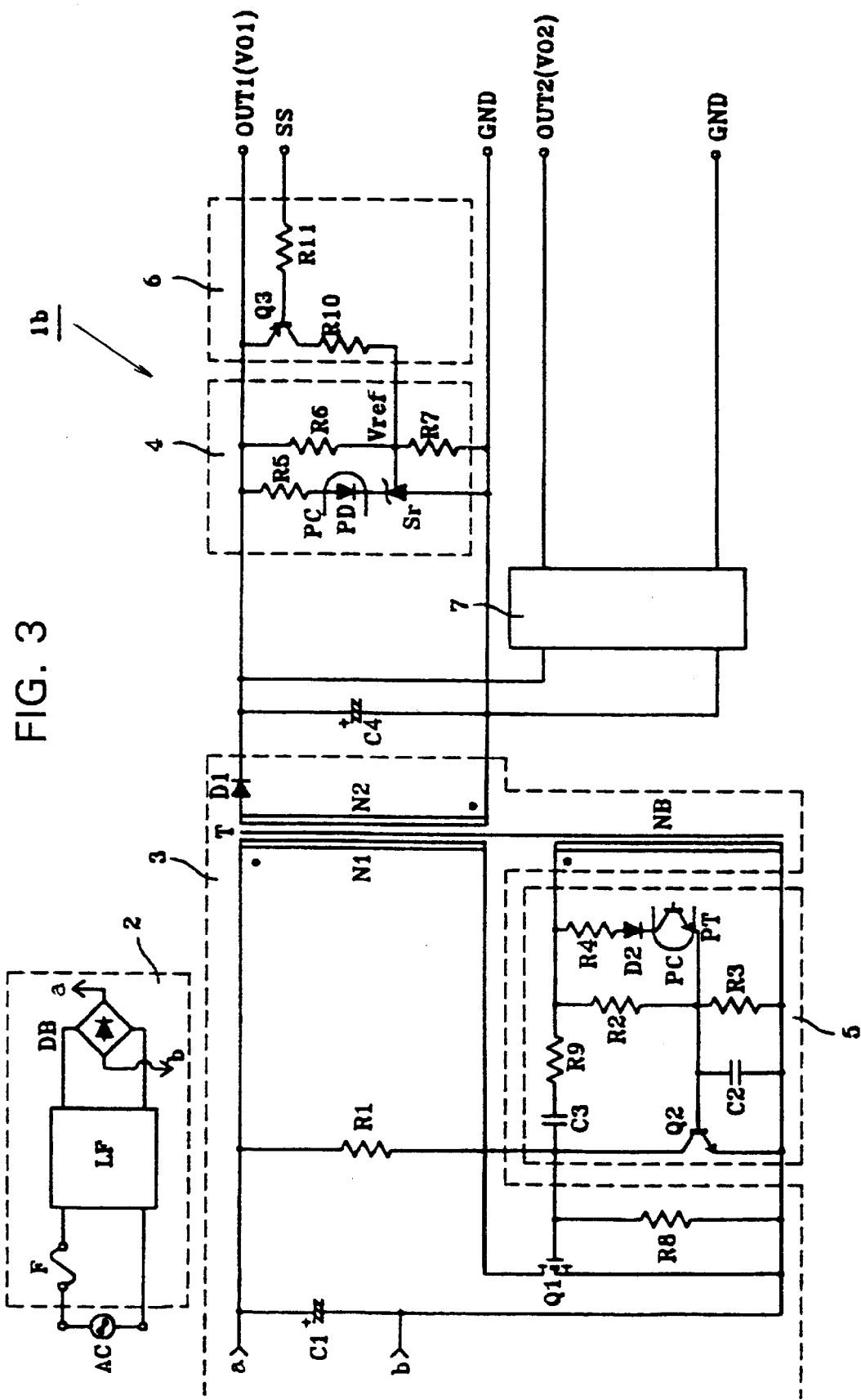
FIG. 3 is a circuit diagram showing a modification of the switching power supply unit shown in FIG. 1.

Next, a modification of the first embodiment will be illustrated referring to FIG. 3. In this figure, the same parts as those in FIG. 1 or the equivalent parts thereto are given the same reference numerals and the explanation thereof is omitted.

In a switching power supply unit 1b shown in FIG. 3, a DC-DC converter 7 is connected between both ends of a secondary winding N2 of a transformer T and a voltage detection circuit 4. An output terminal OUT1 is provided from an impedance adjustment circuit 6, and an output terminal OUT2 is provided from the DC-DC converter 7. From the output terminals OUT1 and OUT2, two output voltages VO1 and VO2 having mutually different values can be obtained. The impedance adjustment circuit 6 allows the output voltage VO1 to drop to be supplied to a load. In addition, dropping of the output voltage VO1 leads to reduction in switching losses and improvement in circuit efficiency. The DC-DC converter 7 allows the output voltage VO2 to be stepped up to a desired value and to be supplied to the load.

Figure 4:
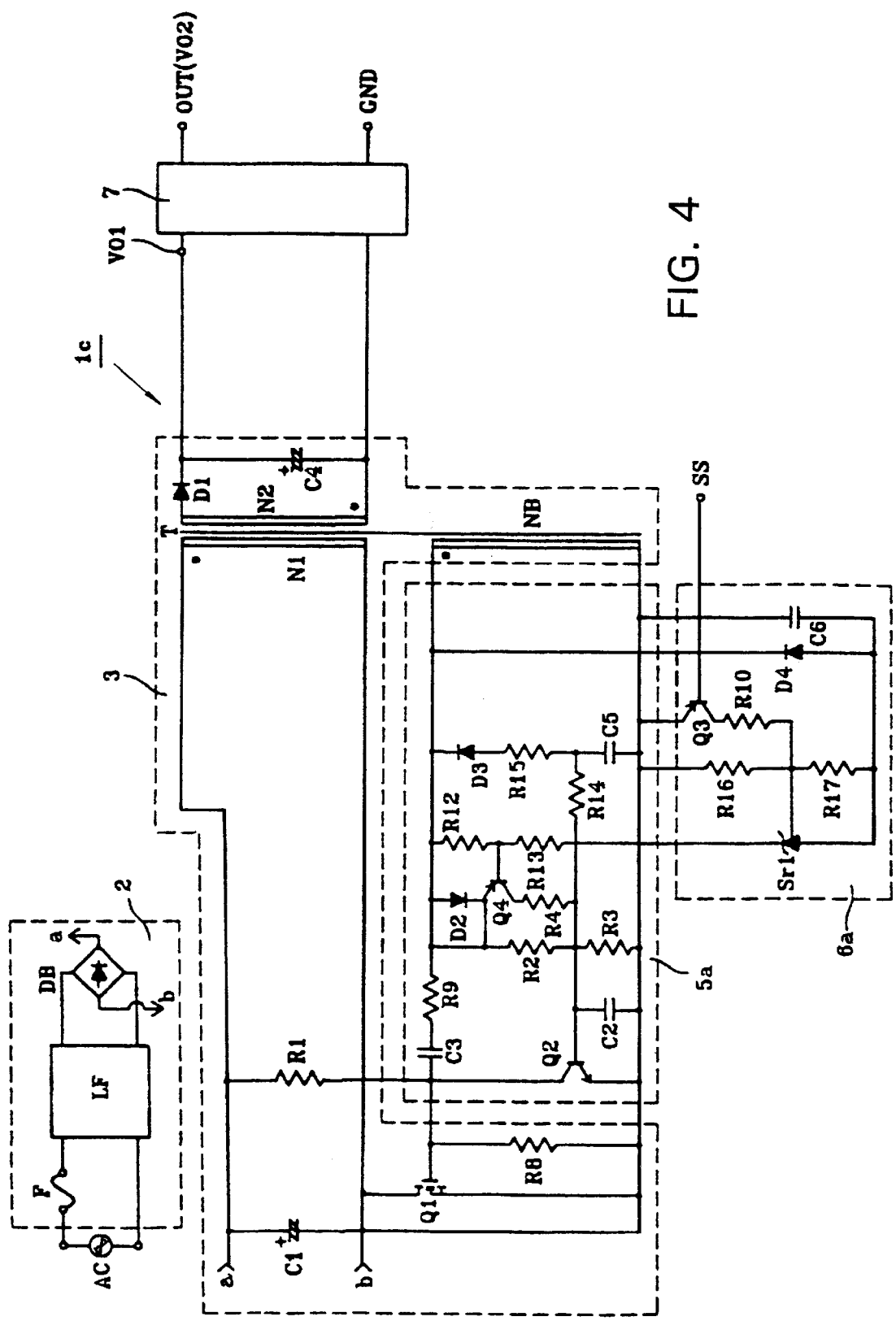
FIG. 4 is a circuit diagram showing a switching power supply unit according to a second embodiment of the present invention.

Referring to FIG. 4, a description will be given of a structure of a switching power supply unit in accordance with a second embodiment of the present invention. In this figure, the same parts as those in FIG. 1 and the equivalent parts thereto are given the same reference numerals and the explanation thereof is omitted.

In a switching power supply unit 1c shown in FIG. 4, a fly-back voltage VNB generated at a feedback winding NB is dropped directly by an impedance adjustment circuit 6a. The switching power supply unit 1c includes a control circuit 5a, the impedance adjustment circuit 6a, and a DC-DC converter 7.

In the control circuit 5a, a transistor Q4 is disposed as an alternative to the photo coupler PC of the control circuit 5a shown in FIG. 1, and on the base side of the transistor Q4 are disposed resistors R12, R13, R14 and R15, a diode D3, and a capacitor C5. The operation of the control circuit 5a is the same as that of a control circuit used in a switching power supply unit of a conventionally known RCC system and the explanation thereof is omitted.

In addition, the impedance adjustment circuit 6a, which is connected between both ends of the feedback winding NB of a transformer T, has a transistor Q3. The (emitter of the transistor Q3 is connected to an end of the feedback winding NB of the transformer T, and the collector thereof is connected to a shunt regulator Sr1 via a resistor R10. The shunt regulator Sr1 is connected to the base of the transistor Q4 via the resistor R13 of the control circuit 5a. A node of the resistor R10 and the shunt regulator Sr1 is connected to resistors R16 and R17. Moreover, the impedance adjustment circuit 6a includes a rectifying diode D4 and a smoothing capacitor C6.

Next, a description will be given of the operation of the impedance adjustment circuit 6a having the above structure.

In a steady state, the transistor Q3 in the impedance adjustment circuit 6a does not conduct. Under the situation, the output voltage VO1 is indicated by equation (6) below. In the following equations (6) to (9), the symbol Vref indicates a reference potential of the shunt regulator Sr, and the symbols R10, R16, and R17 indicate the resistance values of the resistors R10, R16, and R17. In addition, the symbols N2 and NB respectively indicate voltages generated at the secondary winding N2 and feedback winding NB of the transformer T. The symbol VE indicates a forward voltage of the diode D1.

$$VO1=Vref \times \{(R16+R17)/R17\} \times (N2/NB)+VF \qquad (6)$$

Under light load, a signal from an electronic device as a load is applied to the impedance adjustment circuit 6a via a reception terminal SS, whereby the transistor Q3 conducts. The output voltage VO1 obtained in this situation is indicated by the following equation (7).

$$VO12=Vref \times (1/R17) \times \{R17+(R16 \times R10)/(R16+R17)\} \qquad (7)$$

In this situation, the following equation (8) holds.

$$R16 >= (R16 \times P10)/(R16+R10) \qquad (8)$$

Therefore, the relationship between the output voltage VO1 of the above equation (6) and the output voltage VO1 of the above equation (7) is indicated by an inequality (9) below.

$$VO1 \text{ (the equation (6))} > VO1 \text{ (the equation (7))} \qquad (9)$$

In this way, when the transistor Q3 conducts and impedance for determining the output voltage VO1 thereby changes, the output voltage VO1 drops.

Furthermore, the switching power supply unit 1c is set such that the level of drop of the output voltage VO1 by the impedance adjustment circuit 6a is adjusted and amplitude is generated within a range below the threshold of the FET Q1 as a main switching element. This allows the OFF time of the FET Q1 to be prolonged so that the oscillation frequency is reduced, as in the case of the first embodiment. Therefore, increase in switching losses due to the rising of the oscillation frequency is suppressed and circuit efficiency can thereby be improved.

In addition, as the fly-back voltage VNB drops, the output voltage VO1 having a value proportional to the value of the fly-back voltage VNB drops. However, the DC-DC converter 7 allows the output voltage VO1 to be stepped up into a desired value to an output voltage VO2, which is supplied to a load.

Although this is not shown in the figure, as a modification of the switching power supply unit 1c shown in FIG. 4, it is possible to use a switching power supply unit such as the switching power supply unit 1b shown in FIG. 3, in which the position of the DC-DC converter 7 is changed and the two output terminals capable of obtaining mutually different output voltages are provided.

Next, a description will be given of a third embodiment in accordance with the present invention referring to FIG. 5. In this figure, the same parts as those in FIG. 1 or the equivalent parts thereto are given the same reference numerals and the explanation thereof is omitted.

Figure 5:
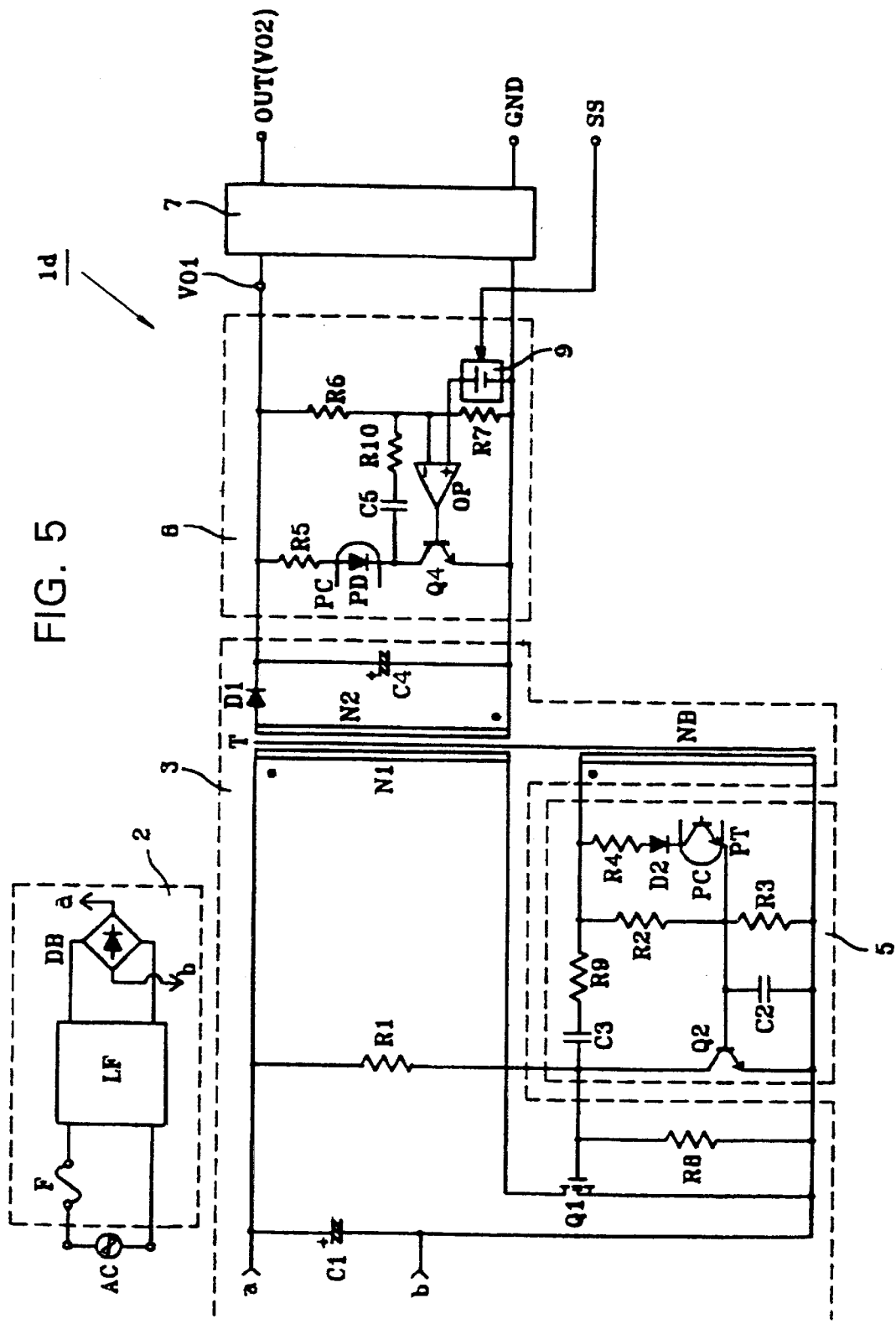
FIG. 5 is a circuit diagram showing a switching power supply unit according to a third embodiment of the present invention.

In a switching power supply unit 1d shown in FIG. 5, instead of the voltage detection circuit 4 and the impedance adjustment circuit 6, a reference voltage adjustment circuit 8 is disposed as a voltage dropping circuit.

The reference voltage adjustment circuit 8 includes resistors R5, R6, R7, R10, a light-emitting diode PD of the light-emitting side of a photo coupler PC, a transistor Q4, a capacitor C5, a differential amplifier OP, and a voltage source 9.

The resistor R5, the light-emitting diode PD, and the transistor Q4 are mutually connected in series and are disposed in parallel to a capacitor 4 of a main operation circuit 3. In addition, the resistors R6 and R7 are mutually connected in series and are similarly disposed in parallel to the capacitor 4. The node of the resistors R6 and R7 is connected to an inverting input end of the differential amplifier OP. A voltage generated at the voltage source 9 changes in response to a signal from an electronic device as a load. The voltage generated at the voltage source 9 is applied to the non-inverting input end of the differential amplifier OP. the output end of the differential amplifier OP is connected to the base of the transistor Q4.

In this situation, as a reference voltage of the differential amplifier OP, the voltage generated at the voltage source 9 is used. The voltage generated at the voltage source 9 can be referred to as a variable reference voltage that changes in response to the signal from the electronic device as a load. The differential amplifier OP and the transistor Q4 operate as error amplifiers. Both of them operate to make the potential difference between the positive (+) and negative (−) terminals zero, with the result that an output voltage VO2 proportionate to the variable reference voltage can be obtained.

In this case, instead of changing the voltage generated at the voltage source 9 by the signal from the electronic device as a load, it is also possible to change the same by a signal from a transmitter disposed inside the switching power supply unit 1d.

Although this is not shown in the figure, as a modification of the switching power supply unit 1d shown in FIG. 5, it is possible to use a switching power supply unit such as the switching power supply unit 1b shown in FIG. 3, in which the position of the DC-DC converter 7 is changed and the two output terminals capable of obtaining mutually different output voltages are provided.

The impedance adjustment circuit described in each embodiment above operates to drop the voltage generated at the secondary winding NB of the transformer. However, a circuit having any other structure can be replaced for that, as long as the circuit operates in the same way.

Furthermore, in each of the embodiments described above, the switching power supply unit having the two output terminals has been illustrated as a switching power supply unit having a plurality of output terminals. However, the present invention can be applied even in the case of a switching power supply unit having three or more output terminals, from each of which an output voltage of a different value can be obtained.

Furthermore, although each of the embodiments described above adopts a case in which a transistor is disposed as a switching element of a voltage dropping circuit, any other element can be used as an alternative to the transistor, as long as it operates in the same way as the transistor does.

Furthermore, although each of the embodiments described above has shown a case in which under light load (in a waiting time), after the dropping of an output voltage, the DC-DC converter steps up the voltage, in contrast to this, it is possible to use a structure in which the DC-DC converter (a voltage-dropping converter) steps down an output voltage in a waiting time, whereas the stepped-down output voltage is outputted without being stepped up/stepped down and stepping down in a waiting time.

Furthermore, although each of the embodiments described above has shown a case in which the DC-DC converter steps up or steps down an output voltage, when the voltage drop in a waiting time is permitted, it is not necessary to provide a DC-DC converter.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply unit comprising:
   a DC power supply;
   a transformer having a primary winding, a secondary winding and a feedback winding;
   a main switching element connected in series to the primary winding to be turned on by a voltage generated at the feedback winding; and
   a voltage dropping circuit for dropping an output voltage obtained from the secondary winding to reduce a fly-back voltage at the feedback winding so that a voltage at a control terminal of the main switching element is maintained at a lower value than that of a threshold voltage of the main switching element.

2. The switching power supply unit of claim 1, wherein the voltage dropping circuit comprises an impedance adjustment circuit for changing impedance determining the output voltage, the impedance adjustment circuit including a switching element having switching terminals and a resistor connected in series to a switching terminal of the switching element.

3. The switching power supply unit of claim 1, wherein the voltage dropping circuit comprises a reference-voltage adjustment circuit for changing a reference voltage determining the output voltage.

4. The switching power supply unit of claim 1, wherein the voltage dropping circuit receives an external signal input and drops the output voltage in response to the signal.

5. The switching power supply unit of claim 1, further comprising a DC-DC converter coupled to the secondary winding for adjusting the output voltage of the secondary winding to a desired level.

6. The switching power supply unit of claim 5, wherein the output of the DC-DC connector and the output of the secondary winding are both provided as power supply outputs.

7. The switching power supply unit of claim 1, wherein the voltage dropping circuit is coupled to the secondary winding.

8. The switching power supply unit of claim 1, wherein the voltage dropping circuit is coupled to the feedback winding.

9. The switching power supply unit of claim 1, wherein a control output of the voltage dropping circuit is coupled to a control input of a voltage regulator for regulating the output voltage of the secondary winding.

10. The switching power supply unit of claim 3, wherein the reference or voltage adjustment circuit comprises a comparator circuit comparing a variable reference voltage from a variable reference voltage source to an output voltage of the secondary winding, an output of the comparator circuit comprising a control signal for a regulator circuit for regulating the output voltage of said secondary winding, the variable reference voltage source having a control input for changing a voltage provided by the variable reference voltage source on response to a control signal.

* * * * *